United States Patent [19]
Amagai et al.

[11] Patent Number: 6,130,307
[45] Date of Patent: Oct. 10, 2000

[54] COMPOSITION FOR A RESIN

[75] Inventors: Akikazu Amagai; Motoharu Takeuchi; Katsuyuki Mizuno, all of Tokyo, Japan

[73] Assignee: Mitsubishi Gas Chemical Co., Inc., Tokyo, Japan

[21] Appl. No.: 09/243,506

[22] Filed: Feb. 1, 1999

[30] Foreign Application Priority Data

Feb. 10, 1998 [JP] Japan .................................. 10-028481

[51] Int. Cl.[7] .......................... C08G 18/38; C08G 18/58; C08G 18/71
[52] U.S. Cl. ................................. 528/73; 528/69
[58] Field of Search ........................................ 528/69, 73

[56] References Cited

U.S. PATENT DOCUMENTS

| | | | |
|---|---|---|---|
| 3,883,596 | 5/1975 | Hager et al. ............................... | 568/55 |
| 5,374,668 | 12/1994 | Kanemura et al. ...................... | 523/451 |
| 5,807,975 | 9/1998 | Amagai et al. .......................... | 528/373 |
| 5,945,504 | 8/1999 | Amagi et al. ............................ | 528/373 |

*Primary Examiner*—Rabon Sergent
*Attorney, Agent, or Firm*—Frishauf, Holtz, Goodman, Langer & Chick, P.C.

[57] ABSTRACT

A composition for a resin comprising (a) a sulfur-containing compound having in one molecule one or more episulfide groups and/or epoxy groups and (b) a compound having in one molecule one or more isocyanate groups and/or thio-isocyanate groups. The composition is useful as an optical material such for a plastic lens for glasses, since the composition exhibits an excellent balance between refractivity index and Abbe number and has a high impact resistance.

19 Claims, No Drawings

COMPOSITION FOR A RESIN

BACKGROUND OF THE INVENTION

1. Field of the Invention

The present invention relates to a composition for a resin which is advantageously used for optical materials, such as plastic lenses, prisms, optical fibers, substrates of information recording materials and filters, particularly as a material of plastic lenses of glasses.

2. Description of the Related Arts

Plastic materials have widely been used as various optical materials, particularly as lenses of their glasses, because of light weight, toughness and easiness of tinting. The properties required for optical materials, particularly for lenses of glasses, are a low specific gravity, optical properties such as a large refractive index and a large Abbe number and physical properties such as high heat resistance and large strength. A large refractive index is important to decrease thickness of a lens. A large Abbe number is important to decrease chromatic aberration of a lens. High heat resistance and large strength are important to facilitate fabrication and also from the standpoint of safety.

As conventional materials having a large refractive index, thermosetting optical materials having a thiourethane structure which are obtained by the reaction of a polythiol compound and a polyisocyanate compound have been proposed (Japanese Patent Publication Heisei 4(1992)-58489 and Japanese Patent Application Laid-Open No. Heisei 5(1993)-148340). Technology to obtain a lens by polymerization of an epoxy resin or an episulfide resin with a multi-functional compound has also been proposed in the specifications of Japanese Patent Application Laid-Open Nos. Heisei 1(1989)-98615 and Heisei 3(1991)-81320 and International Publication No. WO8910575. Of course, optical materials having further large refractive indices are desirable.

A small chromatic aberration is another important property required for an optical material. The larger the Abbe number, the smaller the chromatic aberration. Therefore, a material having a large Abbe number is also desirable. Thus, a material having a large refractive index and a large Abbe number is desired.

However, the Abbe number tends to decrease with an increase in the refractive index. Plastic materials obtained from conventional compounds have the maximum Abbe number of about 50 to 55 when the refractive index is 1.50 to 1.55, about 40 when the refractive index is 1.60 and about 31 when the refractive index is 1.66. When the refractive index is forced to increase to 1.70, the Abbe number decreases to 30 or less and the obtained material cannot practically be used.

Moreover, in the case of conventional materials, particularly materials having a thiourethane structure, the molecular weight of a sulfur-containing compound used as the raw material must be increased to achieve a large refractive index and this decreases crosslinking density. The content of alkyl groups must be increased to achieve a large Abbe number and this decreases the rigidity of molecules of raw material compounds. As the result, drawbacks such as a decrease in heat resistance arises. In other words, the refractive index of conventional optical materials obtained from episulfide compounds, polythiol compounds and isocyanate compounds can be increased only to a limited degree. Moreover, an increase in the refractive index decreases the Abbe number. Therefore, an advantageous balance between a large refractive index and a large Abbe number cannot be achieved by conventional optical materials.

To solve the above problems, the present inventors discovered novel sulfur-containing compounds having an episulfide structure from which optical materials having a small thickness and a decreased chromatic aberration can be obtained (Japanese Patent Application Laid Open Nos. Heisei 9(1997)-110979 and Heisei 9(1997)-71580). The present inventors further discovered resin compositions which give optical materials showing improved oxidation resistance and tint performance from those of optical materials obtained by curing the above sulfur-containing compounds by polymerization (Japanese Patent Application Nos. Heisei 9(1997)-104724 and Heisei 9(1997)-333120). However, optical materials obtained from these compositions do not have a sufficient impact resistance. When an optical material has a small impact resistance, the optical material is required to have a thickness large enough for providing a practical strength. This causes a critical problem for decreasing the thickness and the weight even though optical materials having a decreased thickness can be designed with respect to the high refractivity index.

SUMMARY OF THE INVENTION

The present invention has an object to provide a composition for a resin which exhibits an excellent balance between a sufficiently high refractivity index and a sufficiently high Abbe number and has a large impact resistance without adverse effects on heat resistance, tint performance and oxidation resistance, i.e., the properties which cannot be obtained as long as conventional compounds are used as the material; and to provide an optical material obtained by curing the composition by polymerization.

The object of the present invention has been achieved by a composition for a resin which comprises:

(a) a compound having one or more structures represented by the following formula (1) in one molecule:

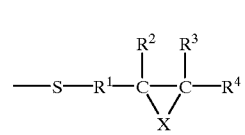

(1)

wherein $R^1$ represents a hydrocarbon group having 1 to 10 carbon atoms, $R^2$, $R^3$ and $R^4$ each represents hydrogen atom or a hydrocarbon group having 1 to 10 carbon atoms and X represents S or O; and (b) a compound having one or more isocyanate groups and/or thioisocyanate groups in one molecule;

wherein a ratio [(II)/(I)] of a total number (II) of isocyanate group and thioisocyanate group in compound (b) to a total number (I) of episulfide group and epoxy group in compound (a) is 0.01 or more and 2.0 or less; and by a resin obtained by curing the composition described above by polymerization.

DESCRIPTION OF THE PREFERRED EMBODIMENTS

In the present invention, the ratio [(II)/(I)] of a total number (II) of isocyanate group and thioisocyanate group in compound (b) to a total number (I) of episulfide group and epoxy group in compound (a) is 0.01 or more and 2.0 or less and preferably 0.05 or more and 1.0 or less.

When the ratio by mol of the total of isocyanate group and thioisocyanate group to the total of episulfide group and/or epoxy group in compound (a) exceeds 2.0, heat resistance of the optical material obtained by curing the composition by polymerization decreases and a high refractivity index is not exhibited. When the ratio is smaller than 0.01, the impact resistance which is the object of the present invention is not obtained.

To obtain the large refractive index which is also the object of the present invention, it is preferable that $R^1$ in formula (1) represents a methylene group or an ethylene group and $R^2$, $R^3$ and $R^4$ in formula (1) represents a hydrogen atom or a methyl group. It is more preferable that $R^1$ represents a methylene group and $R^2$, $R^3$ and $R^4$ represents a hydrogen atom.

Among the compounds having one or more structures represented by formula (1) in one molecule, compounds represented by the following formula (2) are preferable:

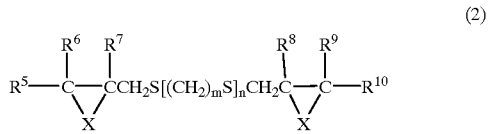

wherein $R^5$ to $R^{10}$ each represents hydrogen atom or a hydrocarbon group having 1 to 10 carbon atoms, X represents S or O excluding the case in which both X represent O, an average number of S represented by X is about 50% or more of a total number of S and O constituting the three-member rings, m represents 1 to 6 and n represents 0 to 4.

In the above formula (2), $R^5$ to $R^{10}$ each preferably represent a hydrogen atom or a methyl group and more preferably a hydrogen atom.

In formulae (1) and (2), X represents S or O. In formula (2), the case in which both X represent O is excluded. It is preferable that X in formulae (1) and (2) represents S.

Examples of compound (a) which is the compound having one or more structures represented by formula (1) in one molecule are as follows. Examples of the compound having one structure represented by formula (1) in one molecule include bis(β-epithiopropyl) sulfide and compounds obtained by substituting at least one hydrogen atom of the episulfide group in bis(p-epithiopropyl) sulfide with a methyl group. Examples of the compound having two or more structures represented by formula (1) in one molecule include:

(A) Organic compounds having a chain aliphatic backbone structure to which two or more structures represented by formula (1) are bonded.
(B) Organic compounds having a cyclic aliphatic backbone structure to which two or more structures represented by formula (1) are bonded.
(C) Organic compounds having an aromatic backbone structure to which two or more structures represented by formula (1) are bonded.

The above compounds may also contain other structures such as sulfides, ethers, sulfones, ketones and esters in the molecule.

Compounds (A) which are organic compounds having a chain aliphatic backbone structure are classified into compounds having a linear structure and compounds having a branched structure. Any of these compounds can be used. Preferable examples of these compounds include linear organic compounds such as bis(β-epithiopropylthio) methane, 1,2-bis(β-epithiopropylthio)ethane, 1,3-bis(β-epithiopropylthio)propane, 1,2-bis(β-epithiopropylthio) propane, 1-(β-epithiopropylthio)-2-(β-epithiopropylthiomethyl)propane, 1,4-bis(β-epithiopropylthio)butane, 1,3-bis(β-epithiopropylthio) butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane and 1-(β-epithiopropylthio)-2-[[2-(2-β-epithiopropylthioethyl) thioethyl]thio]ethane; branched organic compounds such as tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropyl-thio)-4-(β-epithiopropylthomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,10-bis(β-epithiopropylthio)-5,6-bis[(2-β-epithiopropylthioethyl)thio]-3,6,9-trithiadecane, 1,11-bis(β-epithiopropylthio)-5,7-[(2-β-epithiopropylthioethyl) thiomethyl]-3,6,9-trithiaundecane and 1,11-bis(β-epithiopropylthio)-4,7-bis(β-epithiopropylthiomethyl)-3,6, 9-trithiaundecane; and compounds obtained by substituting at least one hydrogen atom of the episulfide group in the above compounds with methyl group.

Preferable examples of the organic compound having a cyclic aliphatic backbone structure include: compounds having one cyclic aliphatic backbone structure in one molecule such as 1,3- and 1,4-bis(β-epithiopropylthio)cyclohexanes and 1,3- and 1,4-bis(β-epithiopropylthiomethyl) cyclohexanes; compounds having two cyclic aliphatic backbone structures in one molecule such as bis[4-(β-epithiopropylthio)cyclohexyl]-methane, 2,2-bis[4-(β-epithiopropylthio)cyclohexyl]propane, bis[4-(β-epithiopropylthio)cyclohexyl] sulfide, 2,5-bis(β-epithiopropylthiomethyl)-1,4-dithiane and 2,5-bis(β-epithiopropylthioethylthiomethyl)-1,4-dithiane; and compounds obtained by substituting at least one hydrogen atom of the episulfide group in the above compounds with methyl group.

Preferable examples of the organic compound having aromatic backbone structures in the molecule include: compounds having one aromatic backbone structure in one molecule such as 1,3- and 1,4-bis(β-epithiopropylthio) benzenes and 1,3- and 1,4-bis(β-epithiopropylthiomethyl) benzenes; compounds having two aromatic backbone structures in one molecule such as bis[4-(β-epithiopropylthio)-phenyl]methane, 2,2-bis[4-(β-epithiopropylthio)phenyl] propane, bis[4-(β-epithiopropylthio)phenyl] sulfide, bis[4-(β-epithiopropylthio)phenyl] sulfone and 4,4'-bis(β-epithiopropylthio)biphenyl; and compounds obtained by substituting at least one hydrogen atom of the episulfide group in the above compounds with methyl group. However, compound (a) is not limited to the above compounds shown as examples. The above compounds may be used singly or as a mixture of two or more compounds.

Among the compounds described above, bis(β-epithiopropyl) sulfide and bis(β-epithiopropylthio)ethane are preferable and bis(β-epithiopropyl) sulfide is more preferable.

Compound (b) used in the present invention is a compound having one or more isocyanate groups and thioisocyanate groups in one molecule. Examples of the compound having one or more isocyanate groups in the molecule include monoisocyanates such as methyl isocyanate, ethyl isocyanate, propyl isocyanate, isopropyl isocyanate, n-butyl isocyanate, sec-butyl isocyanate, tert-butyl isocyanate, pentyl isocyanate, hexyl isocyanate, octyl isocyanate, dodecyl isocyanate, cyclohexyl isocyanate, phenyl isocyanate and toluyl isocyanate; polyisocyanates such as diethylene diisocyanate, tetramethylene diisocyanate, hexamethylene diisocyanate, cyclohexane diisocyanate, 1,3-bis (isocyanatomethyl)cyclohexane, 1,4-bis(isocyanatomethyl) cyclohexane, isophorone diisocyanate, 2,6-bis (isocyanatomethyl)decahydronaphthalene, lysine trilsocyanate, 1,3-phenylene diisocyanate, 1,4-phenylene diisocyanate, 4,4+diisocyanatobiphenyl, 4,4'-diisocyanato-3,3'-dimethylbiphenyl, 1,1'-methylenebis(4-isocyanatobenzene), 1,1'-methylenebis(3-methyl-4-isocyanatobenzene), m-xylylene diisocyanate, p-xylylene diisocyanate, 1,3-bis(2-isocyanato-2-propyl)benzene and 2,6-b)is(isocyanatomethyl)naphthalene; dimers of these polyisocyanates obtained by the buret reaction; cyclic trimers of these polyisocyanates; and addition products of these polyisocyanates with alcohols and thiols.

Examples of the compounds having one or more thioisocyanate groups in one molecule of compound (b) include compounds obtained by replacing all isocyanate groups in the above compounds having one or more isocyanate groups in the molecule with thioisocyanate group.

Examples of the compounds having one or more isocyanate groups and one or more thioisocyanate groups in the molecule of compound (b) include compounds obtained by replacing a portion of the isocyanate groups in the above compounds having two or more isocyanate groups in the molecule with thioisocyanate group.

However, compound (b) used in the present invention is not limited to the above compounds. The above compounds can be used singly or as a combination of two or more compounds.

A resin can be produced by curing compound (a) and compound (b) which constitute the composition of the present invention by polymerization under heating in the presence or in the absence of a curing catalyst. It is preferable that a curing catalyst is used. As the curing catalyst, amines, phosphines, mineral acids, Lewis acids, organic acids, silicic acids and tetrafluoroboric acid are used. Specific examples of the curing catalysts are as follows:

(1) Primary monoamines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, 2- and 4-aminopiperidines, 2- and 4-aminomethylpiperidines, 2- and 4-aminoethylpiperidines, N-aminoethylpiperidine, N-aminopropylpiperidine, N-aminoethylmorpholine, N-aminopropylmorpholine, isophoronediamine, menlthanediamine, 1,4-bisaminopropylpiperadine, o-, m- and p-phenylenediamines, 2,4- and 2,6-tolylenediamines, 2,4-toluenediamine, m-aminobenzylamine, 4-chloro-o-phenylenediamine, tetrachloro-p-xylylenediamine, 4-methoxy-6-methyl-m-phenylenediamine, m- and p-xylylenediamines, 1,5- and 2,6-naphthalenediamines, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperadine, N-aminopropylpiperadine, 1,4-bis(aminoethylpiperadine), 1,4-bis(aminopropylpiperadine), 2,6-diaminopyridine and bis(3,4-diaminophenyl) sulfone; secondary monoamines such as diethylamine, dipropylamine, di-n-butylamine, di-sec-butylamine, diisobutylamine, di-n-pentylamine, di-3-pentylamine, dihexylamine, dioctylamine, di(2-ethylhexyl) amine, methylhexylamine, diallylamine, pyrrolidine, piperidine, 2-, 3- and 4-picolines, 2,4-, 2,6- and 3,5-lupetidines, diphenylamine, N-methylaniline, N-ethylaniline, dibenzylamine, methylbenzylamine, dinaphthylamine, pyrrol, indoline, indole and morpholine; secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di-(4-piperidyl)methane, 1,2-di-(4-piperidyl)ethane, 1,3-di-(4-piperidyl)propane, 1,4-di(4-piperidyl)butane and tetramethylguanidine; tertiary amines such as trimethylamine, triethylamine, tri-n-propylamine, triisopropylamine, tri-1,2-dimethylpropylamine, tri-3-methoxypropylamine, tri-n-butylamine, triisobutylamine, tri-sec-butylamine, tri-n-pentylamine, tri-3-pentylamine, tri-n-hexylamine, tri-n-octylamine, tri-2-ethylhexylamine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine and 2-(2-dimethylaminoethoxy)-4-methyl-1,3,2-dioxabornane; tertiary polyamines such as tetramethyl-ethylenediamine, pyrazine, N,N'-dimethylpyrazine, N,N'-bis((2-hydroxy)-propyl)piperadine, hexamethylenetetramine, N,N,N',N'-tetramethyl-1,3-butaneamine, 2-dimelthylamino-2-hydroxypropane, diethyaminoethanol, N,N,N-tris(3-dimethylaminopropyl) amine, 2,4,6-tris(N,N,N-dimethylaminomethyl)phenol and heptamethylisobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-bennzyl-2-metlhylimidazole, N-(2'-cyanoethyl)-2-methylimidazole, N-(2'-cycanoethyl)-2-undecylimidazole, N-(2'-cyanoethyl)-2-phenylimidazole, 3,3-bis(2-ethyl-4-methylimidazolyl) methane, addition products of alkylimidazoles and isocyanuric acid and condensation products of alkylimidazoles and formaldehyde; and amidines such as 1,8-diazabicyclo(5,4,0)undecene-7,1,5-diazabicyclo(4,3,0)nonene-5,6-dibutylamino-1,8-diazabicyclo(5,4,0)undecene-7.

(2) Salts of the amines described above in (1) with mineral acids, Lewis acids, organic acids, silicic acid and tetrafluoroboric acid. (3) Quaternary ammonium salts such as tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogensulfite, tetra-n-butylammonium tetrafluoroborate, tetra-n-butylammonium tetraphenylborate, tetra-n-butylammonium para-toluenesulfonate, tetra-n-hexylammonium chloride, tetra-n-hexylammoniumn bromide, tetra-n-hexylammonium acetate, tetra-n-octylammonium chloride, tetra-n-octylammonium bromide, tetra-n-octylammonium acetate, trimethyl-n-octylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, methyltriphenylammonium chloride, methyltriphenylammonium bromide, ethyltriphenylammonium chloride, ethyltriphenylammonium bromide, n-butyltriphenylammonium chloride, n-butyltriphenylammonium bromide, 1-menthylpyridinium bromide, 1-ethylpyridinium bromide, 1-n-butylpyridinium bromide, 1-n-hexylpyridinium bromide, 1-n-octylpyridiniu m bromide, 1-n-dodecylpyridinium bromide, 1-n-phenylpyridinium bromide, 1-methylpicolinium bromide, 1-ethylpinoliniuin bromide, 1-n-butylpicolinium bromide, 1-n-hexylpicoliniuin bromide, 1-n-octylpicolinium bromide, 1-n-dodecylpicolinium bromide and 1-phenylpicolinium bromide.

(4) Phosphonium salts such as tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphen.phosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, tetrakishydroxymethylphosphonium chloride, tetrakishydroxymethylphosphonium bromide, tetrakishydroxyethylphosphonium chloride and tetrakishydroxybutylphosphonium chloride.

(5) Sulfonium salts such as trimethylsulfonium bromide, triethylsulfonium bromide, tri-n-butylsulfonium chloride, tri-n-butylsulfonium bromide, tri-n-butylsulfonium iodide, tri-n-butylsulfonium tetrafluoroborate, tri-n-hexylsulfonium bromide, tri-n-octylsulfonium bromide, triphenylsulfonium chloride, triphenylsulfonium bromide and triphenylsulfonium iodide.

(6) Iodonium salts such as diphenyliodonium chloride, diphenyliodonium bromide and diphenyliodonium iodide.

(7) Complexes of the amines described above in (1) with borane and trifluoroboron.

(8) Phosphines such as trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris-(diethylamino)phosphine, tris(4-methylphenyl) phosphine, dimethylphenylphosphine, diethylphenylphosphine, dicyclohexyolphenylphosphine, ethyldiphenylphosphine, diphenylcyclohexylphosphine and chlorodiphenylphosphine.

(9) Mineral acids such as hydrochloric acid, sulfuric acid, nitric acid, phosphoric acid and carbonic acid. Half-esters of these mineral acids can also be used.

(10) Lewis acids such as boron trifluoride and boron trifluoride etherates.

(11) Organic acids and half-esters of organic acids.

(12) Silicic acids and tetrafluoroboric acid.

(13) Compounds of tin such as dibutyltin dilaurate, dibutyltin dichloride and tributyltin chloride.

Among these compounds, primary monoamines, secondary monoamines, tertiary monoamines, tertiary polyamines, imidazoles, amidines, quaternary ammonium salts, phosphines and tin compounds are preferable because these compounds cause little coloring of the cured products. Compounds having one or less group which can react with the episulfide group such as secondary monoamines., tertiary monoamines, tertiary polyamines, imidazoles, amidines, quaternary ammonium salts and phosphines are more preferable. These compounds may be used singly or as a mixture of two or more compounds. The above curing catalyst is used in an amount generally in the range of 0.0001 to 1.0 mol, preferably in the range of 0.0001 to 0.5 mol, more preferably in the range of 0.0001 mol or more and less than 0.1 mol and most preferably in the range of 0.0001 to 0.05 mol per 1 mol of the compound having one or more structures represented by formula (1) in one molecule. When the amount of the curing catalyst exceeds 1.0 mol, the refractivity index and heat resistance of the cured product decrease and the cured product is colored. When the amount is less than 0.0001 mol, the curing does not proceed sufficiently and heat resistance becomes insufficient.

It is also possible that compounds having one or more SH groups is used in the material obtained by curing the composition of the present invention by polymerization as an antioxidant component singly or in combination with conventional antioxidants to provide the material with a further improved oxidation resistance and strength. Examples of the compound having one or more SH groups include mercaptans, thiophenols and mercaptans and thiophenols having unsaturated groups such as vinyl group, aromatic vinyl groups, methacryl group, acryl group and ally group. Specific examples of the mercaptan include monomercaptans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, benzyl mercaptan, 4-chlorobenzyl mercaptan, methyl thioglycolate, ethyl thioglycolate, n-butyl thioglycolate, n-octyl thioglycolate, methyl (3-mercaptopropionate), ethyl (3-mercaptopropionate), 3-methoxybutyl (3-methylpropionate), n-butyl (3-mercaptopropionate), 2-ethylhexyl (3-mercaptopropionate), n-octyl (3-mercaptopropionate), 2-mercaptoethanol, 3-mercaptoethanol, 2-mercaptopropanol, 2-hydroxypropylmercaptan, 2-phenyl-2-mercaptoethanol, 2-phenyl-2-hydroxyethylmercaptan, 3-mercapto-1,2-propanediol and 2-mercapto-1,3-propanediol; and polymercaptans such as methanedithiol, 1,2-dimercaptoethane, 1,2-dimercaptopropane, 2,2-dimercaptopropane, 1,3-dimercaptopropane, 1,2,3-trimercaptopropane, 1,4-dimercaptobutane, 1,6-dimercaptohexane, bis(2-mercaptoethyl) sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis-(mercaptomethyl)methane, ethylene glycol bis(2-mercaptoacetate), ethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,1-dimercaptocyclohexane, 1,4-dimercaptocyclohexane, 1,3-dimercaptocyclohexane, 1,2-dimercaptocyclohexane, 1,4-bis(mercaptomethyl)cyclohexane, 1,3-bis-(mercaptomethyl)cyclohexane, 2,5-bis(mercaptomethyl)-1,4-dithiane, 2,5-bis(2-mercaptoethy)-1,4-dithiane, 2,5-bis(mercaptomethyl)-1-thiane, 2,5-bis(2-mercaptoethyl)-1-thiane, 1,4-bis(mercaptomethyl)benzene, 1,3-bis(mercaptomethyl)benzene, bis(4-mercaptophenyl) sulfide, bis(4-mercaptophenyl) ether, 2,2-bis(4-mercaptophenyl)propane, bis(4-mercaptomethylphenyl) sulfide, bis(4-mercaptomethylphenyl) ether, 2,2-bis(4-mercaptomethylphenyl)propane, 2,5-dimercapto-1,3,4-thiadiazole, 3,4-thiophenedithiol, 1,2-dimercapto-3-propanol, 1,3-dimercapto-2-propanol and glyceryl dithioglycolate.

Specific examples of the thiophenol include thiophenol, 4-tertbutylthiophenol, 2-methylthiophenol, 3-methylthiophenol, 4-methylthiophenol, 1,2-dimercaptobenzene, 1,3-dimercaptobenzene, 1,4-dimercaptobenzene, 2-hydroxythiophenol, 3-hydroxythiophenol and 4-hydroxythiophenol.

Specific examples of the mercaptans and thiophenols having unsaturated groups are as follows.

Specific examples of the mercaptan having unsaturated groups include allyl mercaptan, 2-vinylbenzyl mercaptan, 3-vinylbenzyl mercaptan and 4-vinylbenzyl mercaptan.

Specific examples of the thiophenol having unsaturated groups include 2-vinylthiophenol, 3-vinylthiophenol and 4-vinylthiophenol.

The above compounds may be used singly or as a combination of two or more compounds. The above compounds can be used in an amount of 0.001 to 80 parts by weight per 100 parts by weight of the composition of the present invention.

To improve the tint performance of the material obtained by curing the composition of the present invention by polymerization, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids, esters of 3-ketocarboxylic acids, and compounds having unsaturated groups may be used in combination as the component to improve the tin performance.

Examples of the carboxylic acid include formic acid, acetic acid, propionic acid, butyric acid, valeric acid, caproic acid, caprylic acid, methyl mercaptopropionate, oxalic acid, malonic acid, succinic acid, glutaric acid, adipic acid, cyclohexanecarboxylic acid, benzoic acid, o-toluic acid, m-toluic acid, p-toluic acid, 2-methoxybenzoic acid, 3-methoxybenzoic acid, phthalic acid, isophthalic acid, terephthalic acid, thiodipropionic acid and dithiodipropionic acid.

Examples of the mercaptocarboxylic acid include thioglycolic acid, 2-thiopropionic acid, 3-thiopropionic acid, thiolactic acid, mercaptosuccinic acid, thiomalic acid, N-(2-mercaptopropionyl)glycine, 2-mercaptobenzoic acid, 2-mercaptonicotinic acid, 3,3-dithioisobutyric acid, dithioglycolic acid, and dithiopropionic acid.

Examples of the hydroxycarboxylic acid include hydroxyacetic acid, α-hydroxypropionic acid, β-hydroxypropionic acid, α-hydroxybutyric acid, β-hydroxybutyric acid, γ-hydroxybutyric acid, salicylic acid, 3-hydroxybenzoic acid and 4-hydroxybenzoic acid.

Examples of the amide include formamide, N-methylformamide, acetamide, N-methylacetamide, phthalamide, isophthalamide, terephthalamide, benzamide, toluamide, 4-hydroxybenzamide and 3-hydroxybenzamide.

Examples of the 1,3-diketone include acetylacetone and cyclohexane-1,3,5-trione.

Examples of the 1,3-dicarboxylic acid and the ester thereof include malonic acid, 2-methylmalonic acid and mono- and diesters thereof.

Examples of the 3-ketocarboxylic acid and the ester thereof include acetoacetic acid and esters thereof As specific examples of the compound having unsaturated groups, alcohols, phenols, mercaptans, thiophenols, mercaptoalcohols, carboxylic acids and amides having unsaturated groups are shown in the following.

Examples of the alcohol having an unsaturated group include monohydroxy compounds such as 2-hydroxyethyl methacrylate, 2-hydroxyethyl acrylate, 3-hydroxypropyl methacrylate, 3-hydroxypropyl acrylate, 2-hydroxypropyl methacrylate, 2-hydroxypropyl acrylate, 1,3-dimethacryloxy-2-propanol, 1,3-diacryloxy-2-propanol, 1-acryloxy-3-methacryloxy-2-propanol, pentaerythritol trimethacrylate, pentaerythritol triacrylate, bis(2,2,2-trimethylolethyl) ether pentamethacrylate, bis(2,2,2-trimethylolethyl) ether pentaacrylate, trimethylolpropane dimethacrylate, trimethylolpropane diacrylate, allyl alcohol, crotyl alcohol, methyl vinyl carbinol, cinnamyl alcohol, 4-vinylbenzyl alcohol, 3-vinylbenzyl alcohol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, 3-phenoxy-2-hydroxylpropyl acrylate, 2-hydroxyethyl isocyanurate bis(acrylate), 2-hydroxyethyl isocyanurate bis(methacrylate), 2-hydroxyethyl cyanurate bis(acrylate), 2-hydroxyethyl cyanurate bis(methacrylate), 3-methyl-1-butyn-3-ol, 3-methyl-1-pentyn-3-ol and propargyl alcohol; polyhydroxy compounds such as pentaerythritol dimethacrylate, pentaerythritol diacrylate, pentaerythritol monomethacrylate, pentaerythritol monoacrylate, trimethylolpropane monomethacrylate, trimethylolpropane monoacrylate, 2-hydroxyethyl isocyanurate mono(acrylate), 2-hydroxyethyl isocyanurate mono(methacrylate), 2-hydroxyethyl cyanurate mono(acrylate) and 2-hydroxyethyl cyanurate mono(methacrylate); and unsaturated polyhydroxy compounds formed by the addition reaction of acrylic acid or methacrylic acid with epoxy compounds which are described later such as 2,2-bis[4-(2-hydroxy-3-methacryloxypropoxy)phenyl]propane.

Examples of the phenol having an unsaturated group include 2-vinylphenol, 3-vinylphenol and 4-vinylphenol.

Examples of the mercaptoalcohol having an unsaturated group include 2-(4-vinylbenzylthio)-2-mercaptoethanol and 2-(3-vinylbenzylthio)-2-mercaptoethanol.

Examples of the carboxylic acid having an unsaturated group include acrylic acid, methacrylic acid, crotonic acid, monohydroxyethyl acrylate phthalate, maleic acid, fumaric acid, monoallyl phthalate and cinnamic acid.

Examples of the amide having an unsaturated group include amides of α,β-unsaturated carboxylic acids such as acrylic acid, methacrylic acid, maleic acid, maleic anhydride and fumaric acid; and N-vinylformamide.

From the standpoint of heat resistance, preferable examples of the above compounds include mercaptoalcohols, hydroxythiophenols and alcohols having unsaturated groups.

The above compounds may be used singly or as a mixture of two or more compounds. The above compounds can be used in an amount of 0.001 to 40 parts by weight per 100 parts by weight of the composition of the present invention.

The composition for a resin of the present invention can be used for producing a resin by curing by polymerization in combination with a compound having two or more functional groups which are reactive with the episulfide group and/or the epoxy group in compound (a), a compound having one or more functional groups which are reactive with the episulfide group and/or the epoxy group in compound (a) and one or more other homopolymerizable functional groups, a compound having one or more homopolymerizable functional group or a compound having one homopolymerizable functional group which is reactive with the episulfide group and/or the epoxy group, in addition to the above antioxidant components and components for improving the tint performance. Examples of the compound having two or more functional groups which are reactive with the episulfide group and/or the epoxy group in compound (a) include epoxy compounds, conventional episulfide compounds and anhydrides of polybasic carboxylic acids.

Examples of the compound having one or more functional groups which are reactive with the episulfide group and/or the epoxy group in compound (a) and one or more other homopolymerizable functional groups include epoxy compounds, episulfide compounds and carboxylic acid anhydrides having unsaturated groups such as methacryl group, acryl group, allyl group, vinyl group and aromatic vinyl groups.

Examples of the compound having one or more homopolymerizable functional group include compounds having unsaturated groups such as methacryl group, acryl group, allyl group, vinyl group and aromatic vinyl groups.

Specific examples of the compound having two or more functional groups which are reactive with the episulfide group and/or the epoxy group are as follows.

Specific examples of the epoxy compound include epoxy compounds derived from phenols which are produced by condensation of epihalohydrins with polyhydric phenols such as hydroquinone, catechol, resorcinol, bisphenol A, bisphenol F, bisphenol sulfone, bisphenol ether, bisphenol sulfide, halogenated bisphenol A and novolak resins; epoxy compounds derived from alcohols which are produced by condensation of epihalohydrins with polyhydric alcohols such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- and 1,4-cyclohexanediols, 1,3- and 1,4-cyclohexanedimethanols, hydrogenated bisphenol A, adducts of ethylene oxide and bisphenol A and adducts of propylene oxide and bisphenol A; epoxy compounds of glycidyl esters which are produced by condensation of epihalohydrins with polybasic carboxylic acid compounds such as adipic acid, sebacic acid, dodecandicarboxylic acid, dimer acid, phthalic acid, isophthalic acid, terephthalic acid, tetrahydrophthalic acid, methyltetrahydrophthalic acid, hexahydrophthalic acid, hexahydroisophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid; epoxy compounds derived from amines which are produced by condensation of epihalohydrins with primary amines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl) ether, 1,2-bis(3-aminopropoxy)ethane, 1,3-bis(3-aminopropoxy)-2,2'-dimethylpropane, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, isophoronediamine, 1,4-bisaminopropylpiperadine, m- and p-phenylenediamines, 2,4- and 2,6-tolylenediamines, m- and p-xylylenediamines, 1,5- and 2,6-naphthalenediamines, 4,4'-diaminodiphenylmethane, 4,4'-diaminodiphenyl ether and 2,2-(4,4'-diaminodiphenyl)propane, and secondary amines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperadyl)methane, 1,2-di(4-piperidyl)ethane, 1,3-di(4-piperidyl)propane and 1,4-di(4-piperidyl)butane; alicyclic epoxy compounds such as 3,4-epoxycyclohexyl 3,4-epoxycyclohexanecarboxylate, vinylcyclohexane dioxide, 2-(3,4-epoxycyclohexyl)-5,5-spiro-3,4-epoxycyclohexanemetadioxane and bis(3,4-epoxycyclohexyl) adipate; epoxy compounds produced by epoxidation of unsaturated compounds such as cyclopentadiene epoxide, epoxidized soy bean oil, epoxidized polybutadiene and vinylcyclohexene epoxide; and epoxy compounds of urethane produced from the above polyhydric alcohols and phenols, dilsocyanates and glycidol.

Examples of the episulfide compound include episulfide compounds obtained by converting a portion of the epoxy group or the entire epoxy group in the above epoxy compounds into episulfide group.

Examples of the polybasic carboxylic acid anhydride include anhydrides of the acids described above as the compounds which produce the epoxy compounds by the condensation with epihalohydrins.

Specific examples of the compound having one functional group which are reactive with the episulfide group and/or the epoxy group in compound (a) and one or more other homopolymerizable functional groups are as follows.

Examples of the epoxy compound having unsaturated groups include vinylphenyl glycidyl ether, vinylbenzyl glycidyl ether, glycidyl methacrylate, glycidyl acrylate and allyl glycidyl ether. Examples of the episulfide compound having unsaturated groups include compounds obtained by replacing the epoxy group in the above epoxy compound having unsaturated group with episulfide group, such as vinylphenyl thioglycidyl ether, vinylbenzyl thioglycidyl ether, thioglycidyl methacrylate, thioglycidyl acrylate and ally thioglycidyl ether.

Examples of the compound having one or more homopolymerizable functional groups include compounds having a structure of an ester of acrylic acid or methacrylic acid and a mono- or polyhydric alcohol such as methyl acrylate, methyl methacrylate, ethyl acrylate, ethyl methacrylate, ethylene glycol diacrylate, ethylene glycol dimethacrylate, diethylene glycol diacrylate, diethylene glycol dimethacrylite, triethylene glycol diacrylate, triethylene glycol dimethacrylate, polyethylene glycol diacrylate, polyethylene glycol dimethacrylate, 1,3-butylene glycol diacrylate, 1,3-butylene glycol dimethacrylate, 1,6-hexanediol diacrylate, 1,6-hexanediol dimethacrylate, neopentyl glycol diacrylate, neopentyl glycol dimethacrylate, polypropylene glycol diacrylate, polypropylene glycol dimethacrylate, 2,2-bis[4-(acryloxyethoxy)phenyl]propane, 2,2-bis[4-(methacryloxyethoxy)phenyl]propane, 2,2-bis[4-(acryloxy•diethoxy)phenyl]propane, 2,2-bis[4-(methacryloxy•diethoxy)phenyl]propane, 2,2-bis[4-(acryloxy•polyethoxy)phenyl]propane, 2,2-bis[4-(methacryloxypolyethoxy)phenyl]propane, trimethylolpropane triacrylate, trimethylolpropane trimethacrylate, pentarythritol tetraacrylate, pentaerythritol tetramethacrylate, bis(2,2,2-trimethylolethyl) ether hexaacrylate and bis(2,2,2-trimethylolethyl) ether hexamethacrylate; allyl compounds such as allyl sulfide, diallyl phthalate and diethylene glycol bisallylcarbonate; vinyl compounds such as acrolein, acrylonitrile and vinyl sulfide; and aromatic vinyl compounds such as styrene, α-methylstyrene, methylvinylbenzene, ethylvinylbenzene, α-chlorostyrene, chlorovinylbenzene, vinylbenzyl chloride, para-divinylbenzene and meta-divinylbenzene.

Preferable examples of the compound having one homopolymerizable functional group which is reactive with the episulfide group and/or the epoxy group include compounds having one epoxy group or episulfide group. Specific examples of such compounds include monoepoxy compounds such as ethylene oxide, propylene oxide and glycidol; glycidyl esters of monocarboxylic acids such as acetic acid, propionic acid and benzoic acid; glycidyl ethers such as methyl glycidyl ether, ethyl glycidyl ether, propyl glycidyl ether and butyl glycidyl ether; monoepisulfides such as ethylene sulfide and propylene sulfide; thioglycidyl esters having a structure derived from the above monocarboxylic acids and thioglycidol (1,2-epithio-3-hydroxypropane); and thioglycidyl ethers such as methyl thioglycidyl ether (1,2-epithiopropyloxymethane), ethyl thioglycidyl ether, propyl thioglycidyl ether and butyl thioglycidyl ether. Among these compounds, compounds having one episulfide group are preferable.

When the compound having two or more functional groups which are reactive with the episulfide group and/or the epoxy group in compound (a) in the composition of the present invention and the compound having one functional group described above and one or more other homopolymerizable functional groups is used, the resin can be produced by curing by polymerization in the presence of a curing catalyst. As the curing catalyst, the amines, the phosphines and the acids described above can be used. Examples of the curing catalyst are the same as those described above.

When the compound having unsaturated groups is used, it is preferable that a radical polymerization initiator is used as the polymerization accelerator. Any compound forming a radical by heating or by irradiation of ultraviolet light or electron beams can be used as the radical polymerization initiator. Examples of the radical polymerization initiator include the following conventional polymerization catalysts used under heating: peroxides such as cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, tert-hexyl peroxyneodecanoate, tert-butyl peroxynneodecanoate, tert-hexyl peroxyneohexanoate, tert-butyl peroxyneohexanoate, 2,4-dichlorobenzoyl peroxide, benzoyl peroxide, dicumyl peroxide and di-tert-butyl peroxide, hydroperoxides such as cumene hydroperoxide and tert-butyl hydroperoxide, and azo compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4-trimethylpentane); and conventional photopolymerization catalysts such as benzophenone and benzoin benzoinmethyl ether. Among these compounds, peroxides, hydroperoxides and azo compounds are preferable and peroxides and azo compounds are more preferable. Most preferable examples include azo compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo] formamide, 2-phenylazo-4-methoxy-2,4-dimethylvaleronitrile, 2,2'-azobis(2-methylpropane) and 2,2'-azobis(2,4,4-trimethylpentane. The above compounds may be used singly or as a mixture of the compounds.

The amount of the radical polymerization initiator is different depending on the components of the composition and the process for curing and cannot be decided. The amount is generally in the range of 0.01 to 5.0% by weight and preferably in the range of 0.1 to 2.0% by weight based on the total amount of the composition.

When optical materials are obtained by curing the composition of the present invention by polymerization, it is, of course, possible that conventional additives such as antioxidants and ultraviolet light absorbents are added to improve the practical properties of the obtained materials. When the composition of the present invention tends to be cleaved from molds during polymerization, it is necessary that conventional external and/or internal adhesion improvers are used or added to control and improve adhesion between the cured material obtained and the mold. Examples of the internal adhesion improver include silane compounds such as 3-methacryloxypropyltrimethoxysilane, 3-glycidoxypropyltrimethoxysilane, N-(2-aminoethyl)-3-aminopropyltrimethoxysilane and 3-mercaptopropyltrimethoxysilane. The internal adhesion improver can be used in an amount of 0.0001 to 5 parts by weight per 100 parts by weight of the composition of the present invention. On the other hand, when the composition of the present invention tends to show difficulty in cleavage from molds after the polymerization, it is possible that the property to release the obtained cured material from the molds is improved by using or adding a conventional external or internal mold release. Examples of the internal mold release include nonionic surfactants containing fluorine, nonionic surfactants containing silicon, quaternary alkylammonium salts, esters of phosphoric acid, esters of hydrogenphosphoric acid, esters of phosphoric acid of oxyalkylene types, alkali metal salts of esters of hydrogenphosphoric acid, alkali metal salts of hydrogenphosphoric acid of oxyalkylene types, metal salts of higher fatty acids, esters of fatty acids, paraffin, wax, higher aliphatic amides, higher aliphatic alcohols, polysiloxanes and addition products of ethylene oxide to aliphatic amines.

When compound (a) and compound (b) as the materials and, optionally, the above components for improving the oxidation resistance and strength, the agents for improving the tint performance, the curing catalysts and the compounds having unsaturated groups and reactive with the episulfide group and/or the epoxy group such as glycidyl methacrylate and thioglycidyl methacrylate (a compound obtained by converting the epoxy group of glycidyl methacrylate into an episulfide group) are used in the curing of the composition of the present invention to obtain optical materials, radical polymerization initiators, radical polymerizable monomers and other additives such as adhesion improvers, antioxidants other than the above antioxidants and ultraviolet absorbents are mixed with the above materials and the prepared mixture is cured by polymerization to produce optical materials such as lenses. The mixture is cast into a mold made of glass or metal and cured by heating and the cured product is then taken out of the mold.

When compound (a), compound (b) and auxiliary materials can react by themselves, it is possible that, before the casting into a mold, a preliminary reaction of the entire amount or a portion of the above compounds is conducted at −100 to 160° C. for 0.1 to 100 hours in the presence or the absence of a catalyst while being stirred or not stirred without other ingredients and/or in combination with other reactive materials and/or auxiliary materials to prepare an intermediate composition and then the prepared intermediate composition is cast into a mold. The auxiliary materials described above are the components for improving the oxidation resistance and strength, the agents for improving the tint performance and a compound selected from the compound having two or more functional groups reactive with the episulfide group and/or the epoxy group of compound (a), the compound having one or more functional groups reactive with the episulfide group and/or the epoxy group of compound (a) and one or more homopolymerizable functional groups, the compound having one or more homopolymerizable functional groups and the compound having one homopolymerizable functional group which is reactive with the episulfide group and/or the epoxy group. When the above compounds cannot react by themselves, the compounds can be treated similarly in combination with other reactive materials and/or auxiliary materials. That the compounds can react by themselves means that the materials and the auxiliary materials comprise compounds which cannot react by themselves alone or that the materials and auxiliary materials are composed of a plurality of components which cannot react by themselves and cannot react with each other.

The curing time is 0.1 to 200 hours and generally 1 to 100 hours. The curing temperature is −10 to 160° C. and generally −10 to 140° C. The polymerization can be conducted by the steps of holding the temperature at a specific polymerization temperature for a specific period of time, increasing the temperature at a speed of 0.1 to 100° C./hour and decreasing the temperature at a speed of 0.1 to 100° C./hour. A combination of these steps may be conducted. To remove strains from the optical material of the present invention, it is preferable that the material obtained after the curing is annealed at a temperature of 50 to 150° C. for about 10 minutes to 5 hours. Where necessary, the prepared material may have treatments of tinting, formation of hard coat, prevention of reflection and prevention of clouding.

The process for producing the optical material by curing the composition of the present invention by polymerization is described more specifically in the following. The main materials and auxiliary materials are mixed together as described above and the obtained mixture is cast into a mold and cured. Compound (a), compound (b) and components which are optionally used, i.e., the compound having two or more functional groups reactive with the episulfide group and/or the epoxy group, the compound having one or more functional groups reactive with the episulfide group and/or the epoxy group and one or more homopolymerizable functional groups, the compound having one or more homopolymerizable groups, the compound having one homopolymerizable functional group which is reactive with the episulfide group and/or the epoxy group, the antioxidants, the curing catalysts, the radical initiators, the adhesion improvers and the stabilizers, may be mixed together in one vessel at the same time in the entire amounts. Alternatively, the components may be added stepwise. Some components may also be mixed together separately in advance and the obtained mixtures may be mixed together in one vessel. The main materials and the auxiliary materials may be mixed together in any desired order. In general, the temperature of mixing and the time of mixing are not limited as long as the components can be sufficiently mixed together. However, an excessively high temperature and an excessively long time are not preferable because undesirable reactions takes place between the components to increase viscosity and the operation of casting becomes difficult. The temperature of mixing should be in the range of about −20 to 100° C., preferably in the range of −10 to 50° C. and more preferably in the range of −5 to 30° C. The time of mixing is in the range of 1 minute to 5 hours, preferably in the range of 5 minutes to 2 hours, more preferably in the range of 5 to 30 minutes and most preferably in the range of about 5 to 15 minutes. It is preferable that degassing under a vacuum is conducted before, during or after mixing the materials and the additives to prevent formation of bubbles during casting and curing in the mold. The pressure of the degassing is 0.1 to 700 mmHg and preferably 10 to 300 mmHg. To obtain a better quality of the optical material of the present invention, it is preferable that impurities are removed by filtration using a microfilter having a pore diameter of about 0.1 to 5 μm or the like before the casting.

To summarize the advantages obtained by the present invention, by using the optical material obtained by curing the composition of the present invention by polymerization, the resin optical material having an excellent balance between a sufficiently high refractivity index and a sufficiently high Abbe number can be provided with a large impact resistance without adverse effects on heat resistance, tint performance and oxidation resistance. In other words, the above combination of properties which cannot be obtained as long as conventional compounds are used as the material can be achieved.

EXAMPLES

The present invention is described more specifically with reference to the following examples. However, the present invention is not limited to the examples. The obtained polymers were evaluated in accordance with the following methods.

Refractivity index (nD) and Abbe number (vD): The refractivity index and the Abbe number were measured at 25° C. using an Abbe refractometer.

Impact resistance: The impact resistance was measured by dropping an iron ball to a flat plate having a thickness of 2.5 mm from the height of 127 cm. Th weight of the ball was increased with an increment of 10 g starting from 10 g until the plate was broken. The impact resistance was expressed as the impact energy required to break the plate.

Example 1

To 100 parts by weight of a mixture containing 75 parts by weight of bis(β-epithiopropyl) sulfide as compound (a), 20 parts by weight of m-xylylene diisocyanate as compound (b) and 5 parts by weight of n-butyl thioglycolate as another component, 0.5 parts by weight of tetrabutylammonium bromide as the catalyst, 0.1 part by weight of 2,6-di-tert-butyl-4-methylphenol as the antioxidant and 0.1 part by weight of 2-(2-hydroxy-5-tert-octylphenyl)benzotriazole as the ultraviolet light absorbent were mixed and the obtained mixture was stirred at a room temperature to obtain a homogeneous solution. The obtained composition was cast into a mold for a lens and cured by polymerization under heating while the temperature was raised from 10° C. to 120° C. during 22 hours in an oven to prepare a lens. The obtained lens had a large impact resistance, showed excellent tint, tint performance, heat resistance and oxidation resistance. The lens not only had excellent optical properties and physical properties but also showed an excellent surface condition with little striae or surface deformation. The properties of the prepared lens are shown in Table 1.

Examples 2 to 12

The same procedures as those conducted in Example 1 were conducted except that the formulation was changed as shown in Table 1 and the catalyst shown in Table 1 was used in an amount also shown in Table 1 per 100 parts by weight of the composition. The results are shown in Table 1.

In all cases, the prepared lens had a large impact resistance and showed excellent tint performance, heat resistance and oxidation resistance. The lens not only had excellent optical properties and physical properties but also showed an excellent surface condition with little striae or surface deformation. The properties of the prepared lens are shown in Table 1.

Comparative Example 1

The same procedures as those conducted in Example 1 were conducted using 100 parts by weight of bis(β-epithiopropyl) sulfide as compound (a). The results are shown in Table 2. The impact resistance was small because compound (b) was not used.

Comparative Example 2

The same procedures as those conducted in Example 1 were conducted using 95 parts by weight of bis(β-epithiopropyl) sulfide as compound (a) and 5 parts by weight of n-butyl thioglycolate as the antioxidant component. The results are shown in Table 1. The impact resistance was small because compound (b) was not used.

Comparative Examples 3 and 4

The same procedures as those conducted in Example 1 were conducted in accordance with the formulations shown in Table 1. The results are shown in Table 1. The impact resistance was small because the relative amounts of compound (b) to compound (a) were outside the range of the present invention.

TABLE 1

|  | formulation (parts by weight) | | | | optical properties | | impact resistance |
| --- | --- | --- | --- | --- | --- | --- | --- |
|  | (a) | (b) | other | catalyst | $n_D$ | $v_D$ | (J) |
| Example 1 | BES (75) | XDI (20) | BTG (5) | TBAB (1) | 1.68 | 36 | 3.6 |
| Example 2 | BES (75) | XDI (20) | BTG (5) | TBPB (0.2) | 1.68 | 36 | 3.7 |
| Example 3 | BES (80) | XDI (15) | BTG (5) | TBAB (1) | 1.69 | 36 | 3.0 |
| Example 4 | BES (75) | XDI (20) | BMES (5) | TBAB (1) | 1.69 | 36 | 3.1 |
| Example 5 | BES (50) | XDI (25) | BMES (25) | TBAB (1) | 1.68 | 36 | 3.7 |
| Example 6 | BES (30) | XDI (30) | BMES (40) | TBAB (1) | 1.67 | 37 | 3.9 |
| Example 7 | BES (75) | XDTI (20) | BTG (5) | TBAB (0.5) | 1.70 | 35 | 2.9 |
| Example 8 | BES (75) | XDTI (20) | BTG (5) | TBPB (0.1) | 1.70 | 35 | 3.1 |
| Example 9 | BES (75) | XDI (20) | BTG (5) | TBAB (1) | 1.68 | 36 | 3.6 |
| Example 10 | BES (75) | IPDI (20) | BTG (5) | TBAB (1) | 1.66 | 39 | 3.5 |
| Example 11 | BES (80) | IPDI (15) | BTG (5) | TBAB (1) | 1.67 | 38 | 2.8 |
| Example 12 | BETE (80) | IPDI (15) | BTG (5) | TBAB (1) | 1.66 | 39 | 3.3 |
| Comparative Example 1 | BES (100) | — | — | TBAB (1) | 1.71 | 36 | 1.6 |
| Comparative Example 2 | BES (95) | — | BTG (5) | TBAB (1) | 1.70 | 36 | 1.5 |
| Comparative | BES (30) | XDI (65) | BTG (5) | TBAB (1) | 1.62 | 39 | 1.8 |

TABLE 1-continued

| | formulation (parts by weight) | | | | optical properties | | impact resistance |
|---|---|---|---|---|---|---|---|
| | (a) | (b) | other | catalyst | $n_D$ | $v_D$ | (J) |
| Example 3 Comparative Example 4 | BES (99) | XDI (1) | — | TBAB (1) | 1.71 | 36 | 1.6 |

Notes:
BES: bis(β-epithiopropyl)sulfide
BETE: bis(β-epithiopropylthio)ethane
XDI: m-xylylene diisocyanate
XDTI: m-xylylene dithioisocyanate
IPDI: isophorone diisocyanate
BTG: n-butyl thioglycolate
BMES: bis(β-mercaptoethyl)sulfide
TBAB: tetra-n-butylammonium bromide
TBPB: tetra-n-butylphosphonium bromide

What is claimed is:

1. A composition for a resin which comprises:
   (a) a compound having in one molecule one or more structures represented by the following formula (1):

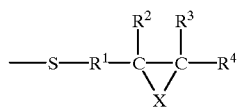
   (1)

wherein $R^1$ represents a hydrocarbon group having 1 to 10 carbon atoms,
   $R^2$, $R^3$ and $R^4$ each represents a hydrogen atom or a hydrocarbon group having 1 to 10 carbon atoms and
   X represents S or O; and
   (b) a compound having in one molecule at least one group selected from the group consisting of an isocyanate group and a thioisocyanate group;
   wherein a ratio ((II)/(I)) of a total number (II) of the isocyanate group and the thioisocyanate group in compound (b) to a total number (I) of an episulfide group and an epoxy group in compound (a) is 0.05:1 to 2.0:1.

2. A composition according to claim 1, wherein $R^1$ is a methylene group or an ethylene group and $R^2$, $R^3$ and $R^4$ each is a hydrogen atom or a methyl group.

3. A composition according to claim 1, wherein $R^1$ is a methylene group and $R^2$, $R^3$ and $R^4$ each is a hydrogen atom.

4. A composition according to claim 1, wherein compound (a) is selected from the group consisting of
   bis(β-epithiopropyl)sulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane and 1-(β-epithiopropylthio)-2-[[2-(2-β-epithiopropylthioethyl)thioethyl]thio]ethane; tetrakis(β-epithiopropylthiomethyl)methane, 1,1,1-tris(β-epithiopropylthiomethyl)propane, 1,5-bis(β-epithiopropylthio)-2-(β-epithlopropylthiomethyl)-3-thiapentane, 1,5-bis(β-epithiopropylthio)-2,4-bis(β-epithiopropylthiomethyl)-3-thiapentane, 1-(β-epithlopropylthio)-2,2-bis(β-epithlopropvlthlomethyl)-4-thiahexane, 1,5,6-tris(β-epithopropyl-thio)-4-(β-epithiopropylthlomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,10-bis(β-epithiopropylthio)-5,6-bis[(2-p-epithiopropylthioethyl)thio]-3,6,9-trithiadecane, 1,11-bis(β-epithiopropylthio)-5,7-[(2-β-epithiopropylthioethyl)thiomethyl]-3,6,9-trithiaundecane, 1,11-bis(β-epithiopropylthio)-4,7-bis(β-epithiopropylthiomethyl)-3,6,9-trithiaundecane, 1,3-bis(β-epithiopropylthio)cyclohexane, 1,4-bis(β-epithiopropylthio)cyclohexane, 1,3-bis(β-epithiopropylthiomethyl) cyclohexane, 1,4-bis(β-epithiopropylthiomethyl)cyclohexane, bis[4-(β-epithiopropylthio)cyclohexyl]-methane, 2,2-bis[4-(β-epithiopropylthio)cyclohexyl]propane, bis[4-(β-epithiopropylthio)cyclohexyl] sulfide, 2,5-bis(β-epithiopropylthiomethyl)-1,4-dithiane, 2,5-bis(β-epithiopropylthioethylthiomethyl)-1,4-dithiane, 1,3-bis(β-epithiopropylthio)benzene, 1,4-bis(β-epithiopropylthio)benzene 1,3-bis(β-epithiopropylthiomethyl)benzene, 1,4-bis(β-epithiopropylthiomethyl)benzene, bis[4-(β-epithiopropylthio)-phenyl]methane, 2,2-bis[4-(β-epithiopropylthio)phenyl]propane, bis[4-(β-epithiopropylthio)phenyl] sulfide, bis[4-(β-epithiopropylthio)phenyl] sulfone and 4,4'-bis(β-epithiopropylthio)biphenyl.

5. The composition according to claim 4, wherein the compound (b) is at least one compound selected from the group consisting of methyl isocyanate, ethyl isocyanate, propyl isocyanate, isopropyl isocyanate, n-butyl isocyanate, sec-butyl isocyanate, tert-butyl isocyanate, pentyl isocyanate, hexyl isocyanate, octyl isocyanate, dodecyl isocyanate, cyclohexyl isocyanate, phenyl isocyanate, toluyl isocyanate, diethylene diisocyanate, tetramethylene diisocyanate, hexamethylene diisocyanate, cyclohexane diisocyanate, 1,3-bis(isocyanatomethyl)cyclohexane, 1,4-bis(isocyanatomethyl)cyclohexane, isophorone diisocyanate, 2,6-bis(isocyanatomethyl)decahydronaphthalene, lysine triisocyanate, 1,3-phenylene diisocyanate, 1,4-phenylene diisocyanate, 4,4diisocyanatobiphenyl, 4,4'-diisocyanato-3,3'-dimethylbiphenyl, 1,1'-methylenebis(4-isocyanatobenzene), 1,1'-methylenebis(3-methyl-4-isocyanatobenzene), m-xylylene diisocyanate, p-xylylene diisocyanate, 1,3-bis(2-isocyanato-2-propyl)benzene and 2,6-bis(isocyanatomethyl)-naphthalene.

6. The composition according to claim 5, wherein compound (a) is selected from the group consisting of bis(β-epithiopropyl)sulfide and bis(β-epithiopropylthio)ethane.

7. The composition according to claim 5, wherein compound (a) is bis(β-epithiopropyl)sulfide.

8. The composition according to claim 1, wherein compound (a) is bis(β-epithiopropyl)sulfide and compound (b) is m-xylylene diisocyanate.

9. The composition according to claim 1, wherein compound (a) is bis(β-epithiopropyl)sulfide and compound (b) is m-xylylene dithioisocyanate.

10. The composition according to claim 1, wherein compound (a) is bis(β-epithiopropyl)sulfide and compound (b) is isophorone diisocyanate.

11. The composition according to claim 1, wherein compound (a) is bis(β-epithiopropylthio)ethane and compound (b) is isophorone diisocyanate.

12. A resin obtained by curing the composition described in claim 1 by polymerization.

13. An optical material obtained by curing the composition described in claim 1 by polymerization.

14. A composition according to claim 1, wherein compound (a) is a compound represented by the following formula (2):

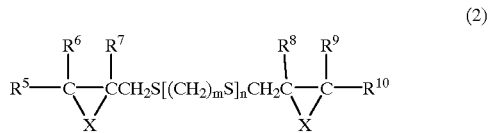

wherein $R^5$ to $R^{10}$ represents a hydrogen atom or a hydrocarbon group having 1 to 10 carbon atoms, X represents S or O excluding the case in which both X represent O, an average number of S represented by X is about 50% or more of a total number of S and O represented by X, m represents 1 to 6 and n represents 0 to 4.

15. A composition according to claim 14, wherein X in formula (2) represents S.

16. A composition according to claim 14, wherein $R^5$ to $R^{10}$ each represent a hydrogen atom or a methyl group.

17. A composition according to claim 14, wherein $R^5$ to $R^{10}$ each represent a hydrogen atom.

18. A resin obtained by curing the composition described in claim 14 by polymerization.

19. An optical material obtained by curing the composition described in claim 14 by polymerization.

* * * * *